United States Patent
Xue et al.

(10) Patent No.: US 10,953,694 B2
(45) Date of Patent: Mar. 23, 2021

(54) ADJUSTABLE POSITION GAUGE

(71) Applicant: CITIC Dicastal CO., LTD, Qinhuangdao (CN)

(72) Inventors: Bowen Xue, Qinhuangdao (CN); Baojun Cui, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 220 days.

(21) Appl. No.: 16/404,370

(22) Filed: May 6, 2019

(65) Prior Publication Data
US 2020/0009909 A1    Jan. 9, 2020

(30) Foreign Application Priority Data
Jul. 4, 2018    (CN) .......................... 201810722826.7

(51) Int. Cl.
| | | |
|---|---|---|
| *G01B 5/14* | (2006.01) | |
| *B60B 31/00* | (2006.01) | |
| *G01B 5/00* | (2006.01) | |
| *B60B 3/00* | (2006.01) | |

(52) U.S. Cl.
CPC ............ *B60B 31/00* (2013.01); *G01B 5/0025* (2013.01); *G01B 5/143* (2013.01); *B60B 3/008* (2013.01)

(58) Field of Classification Search
CPC ........ B06B 31/00; G01B 5/0025; G01B 5/143
USPC ........ 33/203, 203.17, 203.18, 203.19, 203.2, 33/203.21
See application file for complete search history.

(56) References Cited

U.S. PATENT DOCUMENTS

| | | | | |
|---|---|---|---|---|
| 4,730,399 A | * | 3/1988 | Campbell ............ | G01B 5/0025 33/203 |
| 5,174,032 A | * | 12/1992 | Beck ..................... | G01B 5/0025 33/203 |
| 5,987,761 A | * | 11/1999 | Ohnesorge ............. | G01B 5/255 33/203.18 |
| 6,055,735 A | * | 5/2000 | Weihrauch ............... | G01B 5/08 33/203 |
| 6,138,366 A | * | 10/2000 | Boess ..................... | G01B 5/255 33/203.18 |
| 6,622,389 B1 | * | 9/2003 | Pellegrino .............. | G01B 5/255 33/203.18 |
| 7,117,603 B1 | * | 10/2006 | Pellegrino .............. | G01B 5/255 33/203.18 |
| 7,926,189 B1 | * | 4/2011 | Pellegrino .............. | G01B 5/255 33/203.18 |
| 7,941,933 B2 | * | 5/2011 | Warkotsch ............ | G01M 1/045 33/203 |
| 2002/0056204 A1 | * | 5/2002 | Corghi .................. | G01M 1/045 33/550 |
| 2005/0120569 A1 | * | 6/2005 | Butler ...................... | G01B 3/20 33/203 |

(Continued)

FOREIGN PATENT DOCUMENTS

CN    202109854 U    1/2012

*Primary Examiner* — George B Bennett
(74) *Attorney, Agent, or Firm* — Calfee, Halter & Griswold LLP

(57) ABSTRACT

The present application provides an adjustable position gauge, which comprises a measuring column, an adjusting block, a set screw, a base plate, a tensioning block, a nut, a conical block and the like. The application may measure the angle between different bolt holes and the position of the wheel bolt hole with different pitch sizes.

1 Claim, 2 Drawing Sheets

(56) References Cited

U.S. PATENT DOCUMENTS

| | | | |
|---|---|---|---|
| 2006/0096109 A1* | 5/2006 | Corghi | G01D 11/30 |
| | | | 33/520 |
| 2011/0113637 A1* | 5/2011 | Inoue | G01B 5/255 |
| | | | 33/203 |
| 2019/0323815 A1* | 10/2019 | Xue | G01B 5/0025 |
| 2019/0353470 A1* | 11/2019 | Xue | G01B 5/061 |
| 2020/0141725 A1* | 5/2020 | Liu | G01M 17/013 |
| 2020/0271444 A1* | 8/2020 | Lyu | G01B 5/0004 |
| 2020/0406676 A1* | 12/2020 | Cai | B60B 7/065 |

* cited by examiner

ADJUSTABLE POSITION GAUGE

CROSS-REFERENCE TO RELATED APPLICATIONS

This application claims priority to Chinese Patent Application No. 201810722826.7 filed on Jul. 4, 2018, which is hereby incorporated by reference in its entirety.

TECHNICAL FIELD

The present application relates to a position gauge, and more particularly to an adjustable position gauge for a wheel bolt hole.

BACKGROUND ART

In the process of machining a wheel, there is a need to detect the position of all the wheel bolt holes so as to ensure the wheel may be assembled smoothly. The traditional detection method is that the position is measured with a position gauge handheld by a worker. In general, a wheel type corresponds to a special position gauge, so that it is not generally applicable for a mixed-line production enterprise.

SUMMARY OF THE INVENTION

It is an object of the present application to provide an adjustable position gauge which may measure the angle between different bolt holes and the position of the wheel bolt hole with different pitch sizes.

In order to achieve the above object, the technical solution of the present application is: Adjustable position gauge includes a measuring column, an adjusting block, a set screw, a base plate, a tensioning block, a nut and a conical block. The central portion of the base plate is provided with a plurality of T-shaped grooves uniformly distributed in the circumferential direction, and the outer side of the central portion of the base plate is also provided with a plurality of T-shaped grooves which are uniformly distributed in the circumferential direction and have a certain arc length. The T-shaped portion of the adjusting block is matched with the curved T-shaped groove of the base plate. The bottom of the adjusting block is provided with a plurality of threaded holes which are matched with the measuring column, so that the horizontal position of the measuring column may be adjusted as needed. The set screw is installed in the top of the adjusting block, and the bottom thereof is in contact with the top of the base plate.

The inner hole of the nut has a thread and is fixed to the top of the base plate. The upper end of the tensioning block is T-shaped, and the outer side of the lower end thereof is a circular surface. The upper T-shaped portion of the tensioning block is matched with the T-shaped grooves in the central portion of the base plate. The inner side of the tensioning block is conical and is matched with the conical surface of the lower end of the conical block. The middle portion of the conical block has an external thread to match with the inner hole of the nut.

During the operation, the position of the adjusting block in the curved T-shaped groove of the base plate is adjusted according to the angle between the bolt holes of the wheel, and then the position is maintained by the set screw. The position of the measuring column on the bottom of the measuring block may be adjusted according to the pitch size of each bolt hole. Each tensioning block is inserted into the central hole of the wheel, so that the bottom of the base plate is flush with the flange of the wheel. The conical block is rotated and moves downward under the action of the nut, and each tensioning block moves outward at the same time so as to tighten the center hole of the wheel. On the condition each measuring column may be inserted into each bolt hole of the wheel, the measured position of the wheel bolt hole is qualified.

The application may measure the angle between different bolt holes and the position of the wheel bolt hole with different pitch sizes in use, and has the characteristics of simple structure, high detection precision, convenient use and low production cost. Therefore the adjustable position gauge of the present application can be adjusted for different wheels to achieve the purpose of general application.

Figure 1:
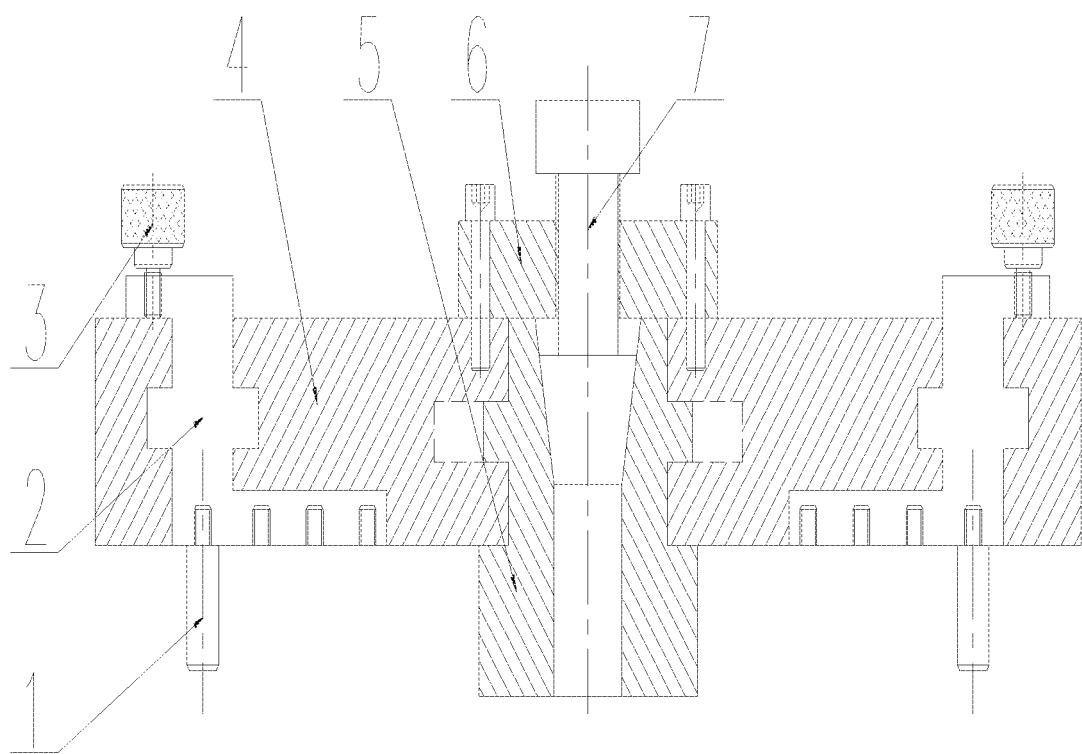
FIG. 1 is a front view of an adjustable position gauge of the present application.
Figure 2:
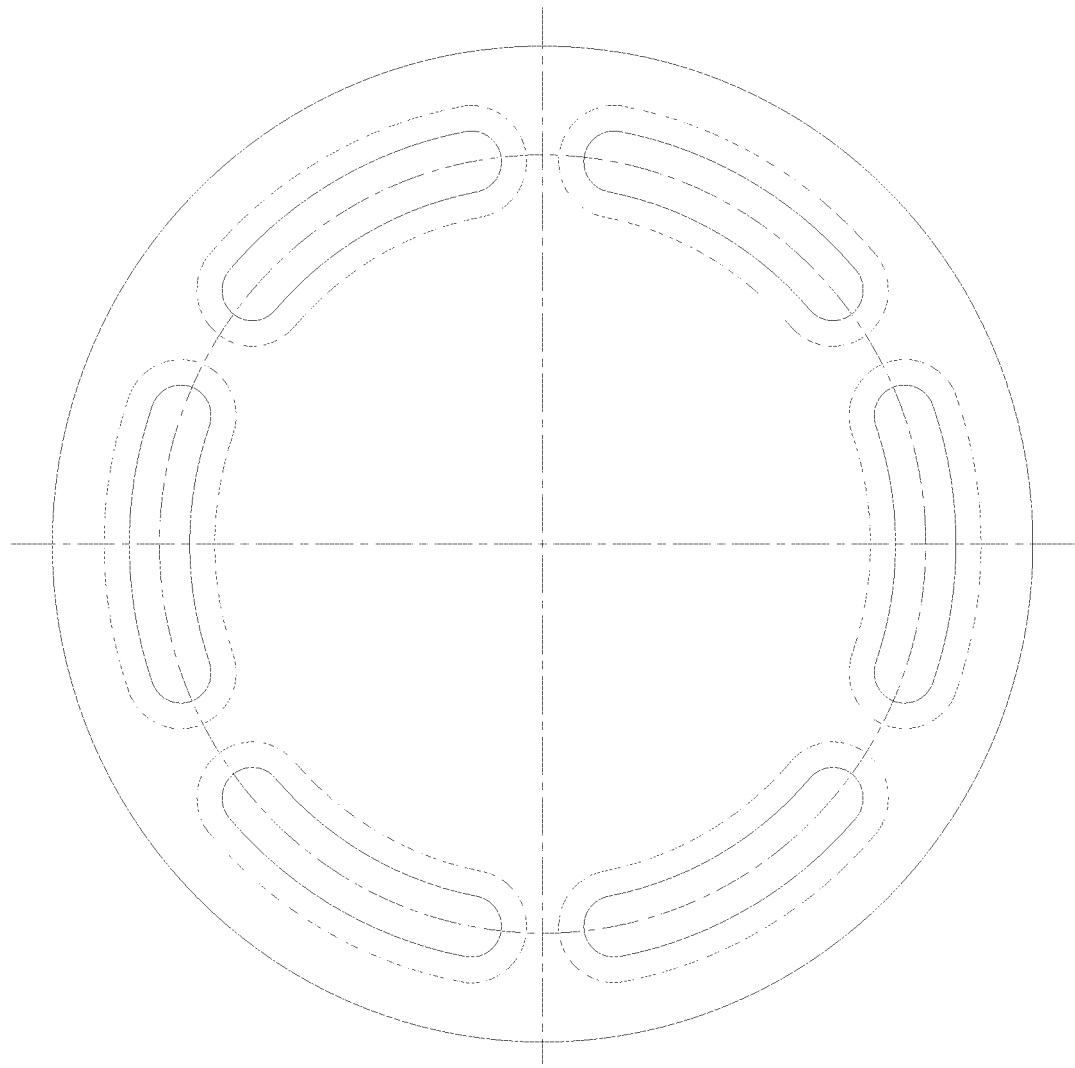
FIG. 2 is a top view of the base plate of the adjustable position gauge of the present application.

In which, 1—measuring column, 2—adjusting block, 3—set screw, 4—base plate, 5—tensioning block, 6—nut, 7—conical block.

DETAILED DESCRIPTION OF THE INVENTION

The details and operation of a specific device according to the present application will be described below with reference to the accompanying drawings.

The device includes a measuring column 1, an adjusting block 2, a set screw 3, a base plate 4, a tensioning block 5, a nut 6 and a conical block 7. The central portion of the base plate 4 is provided with a plurality of T-shaped grooves uniformly distributed in the circumferential direction, and the outer side of the central portion of the base plate 4 is also provided with a plurality of T-shaped grooves which are uniformly distributed in the circumferential direction and have a certain arc length. The T-shaped portion of the adjusting block 2 is matched with the curved T-shaped groove of the base plate 4. The bottom of the adjusting block 2 is provided with a plurality of threaded holes which are matched with the measuring column 1, so that the horizontal position of the measuring column 1 may be adjusted as needed. The set screw 3 is installed in the top of the adjusting block 2, and the bottom thereof is in contact with the top of the base plate 4.

The inner hole of the nut 6 has a thread and is fixed to the top of the base plate 4. The upper end of the tensioning block 5 is T-shaped, and the outer side of the lower end thereof is a circular surface. The upper T-shaped portion of the tensioning block 5 is matched with the T-shaped grooves in the central portion of the base plate 4. The inner side of the tensioning block 5 is conical and is matched with the conical surface of the lower end of the conical block 7. The middle portion of the conical block 7 has an external thread to match with the inner hole of the nut 6.

During the operation, the position of the adjusting block 2 in the curved T-shaped groove of the base plate 4 is adjusted according to the angle between the bolt holes of the wheel, and then the position is maintained by the set screw 3. The position of the measuring column 1 on the bottom of the measuring block 2 may be adjusted according to the pitch size of each bolt hole. Each tensioning block 5 is inserted into the central hole of the wheel, so that the bottom of the base plate 4 is flush with the flange of the wheel. The conical block 7 is rotated and moves downward under the action of the nut 6, and each tensioning block 5 moves outward at the same time so as to tighten the center hole of the wheel. On the condition each measuring column 1 may be inserted into each bolt hole of the wheel, the measured position of the wheel bolt hole is qualified.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. Adjustable position gauge, comprising: a measuring column, an adjusting block, a set screw, a base plate, a tensioning block, a nut and a conical block; central portion of the base plate is provided with a plurality of T-shaped grooves uniformly distributed in the circumferential direction, and outer side of the central portion of the base plate is also provided with a plurality of T-shaped grooves which are uniformly distributed in the circumferential direction and have a certain arc length; T-shaped portion of the adjusting block is matched with curved T-shaped groove of the base plate; bottom of the adjusting block is provided with a plurality of threaded holes which are matched with the measuring column, so that horizontal position of the measuring column is configured to be adjusted as needed; the set screw is installed in top of the adjusting block, and bottom of the adjusting block is in contact with top of the base plate;

inner hole of the nut has a thread and is fixed to the top of the base plate, upper end of the tensioning block is T-shaped, and outer side of lower end of the tensioning block is a circular surface, upper T-shaped portion of the tensioning block is matched with the T-shaped grooves in central portion of the base plate; inner side of the tensioning block is conical and is matched with conical surface of lower end of the conical block, middle portion of the conical block has an external thread to match with the inner hole of the nut.

* * * * *